(12) United States Patent
Medford et al.

(10) Patent No.: US 9,832,520 B2
(45) Date of Patent: *Nov. 28, 2017

(54) METHODS AND APPARATUS TO BROADCAST ADVANCED TELEVISION SYSTEM COMMITTEE VIDEO IN SWITCHED DIGITAL VIDEO SYSTEMS

(71) Applicant: AT&T Intellectual Property I, L.P., Atlanta, GA (US)

(72) Inventors: Brad Medford, Austin, TX (US); Debra Phillips, Austin, TX (US); Vernon Daniel Reed, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,559

(22) Filed: Jan. 22, 2016

(65) Prior Publication Data
US 2016/0156963 A1 Jun. 2, 2016

Related U.S. Application Data

(63) Continuation of application No. 13/710,194, filed on Dec. 10, 2012, now Pat. No. 9,277,289, which is a
(Continued)

(51) Int. Cl.
*H04N 21/434* (2011.01)
*H04N 21/438* (2011.01)
(Continued)

(52) U.S. Cl.
CPC ........... *H04N 21/4347* (2013.01); *H04N 7/52* (2013.01); *H04N 21/235* (2013.01);
(Continued)

(58) Field of Classification Search
CPC ............. H04N 21/6332; H04N 21/235; H04N 21/2362; H04N 21/434; H04N 21/4345;
(Continued)

(56) References Cited

U.S. PATENT DOCUMENTS 5,917,815 A 6/1999 Byers et al.
6,313,886 B1 11/2001 Sugiyama
(Continued)

FOREIGN PATENT DOCUMENTS

WO 2006115697 11/2006

OTHER PUBLICATIONS

United States Patent and Trademark Office, "Non-Final Office Action", issued in connection with U.S. Appl. No. 11/112,299, dated Apr. 10, 2008 (14 pages).
(Continued)

*Primary Examiner* — Ricky Chin
(74) *Attorney, Agent, or Firm* — Hanley, Flight & Zimmerman, LLC

(57) ABSTRACT

Methods and apparatus are disclosed to broadcast advanced television system committee (ATSC) video in switched digital video (SDV) systems. An example SDV broadcast method includes accessing an instruction to de-multiplex at least one of a plurality of multiple program transport streams, the instruction identifying a first program stream of the plurality of program streams for inclusion and a second program stream of the plurality of program streams for exclusion based on a rating region table (RRT). The plurality of program streams are de-multiplexed according to the instruction.

20 Claims, 7 Drawing Sheets

Related U.S. Application Data continuation of application No. 11/112,299, filed on Apr. 22, 2005, now Pat. No. 8,352,979.

(51) Int. Cl.

| | | |
|---|---|---|
| *H04N 21/236* | (2011.01) | |
| *H04N 21/2362* | (2011.01) | |
| *H04N 21/2365* | (2011.01) | |
| *H04N 7/52* | (2011.01) | |
| *H04N 21/235* | (2011.01) | |
| *H04N 21/435* | (2011.01) | |
| *H04N 21/61* | (2011.01) | |
| *H04N 21/84* | (2011.01) | |
| *H04N 21/6332* | (2011.01) | |
| *H04N 21/454* | (2011.01) | |
| *H04N 21/643* | (2011.01) | |

(52) U.S. Cl.
CPC ....... *H04N 21/236* (2013.01); *H04N 21/2362* (2013.01); *H04N 21/2365* (2013.01); *H04N 21/434* (2013.01); *H04N 21/435* (2013.01); *H04N 21/4345* (2013.01); *H04N 21/4542* (2013.01); *H04N 21/6112* (2013.01); *H04N 21/6118* (2013.01); *H04N 21/6332* (2013.01); *H04N 21/64322* (2013.01); *H04N 21/84* (2013.01)

(58) Field of Classification Search
CPC ............. H04N 21/435; H04N 21/6112; H04N 21/6118; H04N 21/54; H04N 7/52
See application file for complete search history.

(56) References Cited

U.S. PATENT DOCUMENTS

| | | | |
|---|---|---|---|
| 6,335,766 B1 | 1/2002 | Twitchell et al. | |
| 6,473,129 B1 | 10/2002 | Choi | |
| 6,567,981 B1 | 5/2003 | Jeffrey | |
| 6,574,217 B1 | 6/2003 | Lewis et al. | |
| 6,741,288 B1 | 5/2004 | Kessler | |
| 6,754,905 B2 | 6/2004 | Gordon et al. | |
| 6,763,522 B1 | 7/2004 | Kondo et al. | |
| 6,820,277 B1 | 11/2004 | Eldering et al. | |
| 6,826,185 B1 | 11/2004 | Montanaro et al. | |
| 7,016,337 B1* | 3/2006 | Wu | H04L 12/6418 370/352 |
| 8,352,979 B2 | 1/2013 | Medford et al. | |
| 9,277,289 B2 | 3/2016 | Medford et al. | |
| 2002/0064189 A1* | 5/2002 | Coupe | H04N 21/434 370/537 |
| 2002/0116705 A1* | 8/2002 | Perlman | H04N 5/4401 725/31 |
| 2002/0129374 A1 | 9/2002 | Freeman et al. | |
| 2002/0174438 A1 | 11/2002 | Cleary et al. | |
| 2002/0184506 A1* | 12/2002 | Perlman | H04N 21/47214 713/182 |
| 2003/0192061 A1 | 10/2003 | Hwangbo et al. | |
| 2003/0217360 A1 | 11/2003 | Gordon et al. | |
| 2004/0122864 A1 | 6/2004 | Silagi et al. | |
| 2004/0148625 A1 | 7/2004 | Eldering et al. | |
| 2004/0190515 A1* | 9/2004 | Nogima | H04N 21/2181 370/392 |
| 2004/0194149 A1* | 9/2004 | Kessler | H04N 21/4345 725/134 |
| 2004/0244058 A1* | 12/2004 | Carlucci | G06F 3/0482 725/135 |
| 2005/0028202 A1 | 2/2005 | Lee | |
| 2005/0028206 A1* | 2/2005 | Cameron | H04N 7/17309 725/46 |
| 2005/0101246 A1* | 5/2005 | Choi | H04N 7/17318 455/3.01 |
| 2005/0152697 A1 | 7/2005 | Lee et al. | |
| 2005/0289623 A1 | 12/2005 | Midani et al. | |
| 2005/0289636 A1 | 12/2005 | Schiller | |
| 2006/0159093 A1* | 7/2006 | Joo | H04H 40/18 370/390 |
| 2006/0218574 A1 | 9/2006 | Van Horck | |
| 2006/0242674 A1 | 10/2006 | Medford et al. | |
| 2006/0242683 A1 | 10/2006 | Medford et al. | |
| 2006/0262222 A1* | 11/2006 | Monnier | H04N 21/4344 348/572 |
| 2007/0242701 A1* | 10/2007 | Lee | H04H 20/86 370/487 |
| 2008/0243760 A1* | 10/2008 | Kou | H04N 7/165 |
| 2009/0147954 A1* | 6/2009 | Pinder | H04N 7/163 380/216 |
| 2010/0023972 A1* | 1/2010 | Summers | H04H 20/42 725/54 |
| 2010/0095325 A1 | 4/2010 | Urdang et al. | |
| 2013/0104167 A1 | 4/2013 | Medford et al. | |

OTHER PUBLICATIONS

United States Patent and Trademark Office, "Non-Final Office Action", issued in connection with U.S. Appl. No. 11/112,299, dated Jun. 2, 2009 (10 pages).

United States Patent and Trademark Office, "Non-Final Office Action", issued in connection with U.S. Appl. No. 11/112,299, dated Oct. 22, 2010 (14 pages).

United States Patent and Trademark Office, "Non-Final Office Action", issued in connection with U.S. Appl. No. 11/112,299, dated Feb. 8, 2012 (7 pages).

United States Patent and Trademark Office, "Final Office Action", issued in connection with U.S. Appl. No. 11/112,299, dated Jan. 7, 2009 (9 pages).

United States Patent and Trademark Office, "Final Office Action", issued in connection with U.S. Appl. No. 11/112,299, dated Mar. 16, 2010 (11 pages).

United States Patent and Trademark Office, "Final Office Action", issued in connection with U.S. Appl. No. 11/112,299, dated Mar. 16, 2011 (17 pages).

United States Patent and Trademark Office, "Final Office Action", issued in connection with U.S. Appl. No. 11/112,299, dated Jul. 10, 2012 (8 pages).

United States Patent and Trademark Office, "Notice of Allowance", issued in connection with U.S. Appl. No. 11/112,299, dated Sep. 18, 2012 (7 pages).

United States Patent and Trademark Office, "Non-Final Office Action", issued in connection with U.S. Appl. No. 11/112,017, dated Apr. 4, 2008 (11 pages).

United States Patent and Trademark Office, "Non-Final Office Action", issued in connection with U.S. Appl. No. 11/112,017, dated Apr. 21, 2009 (13 pages).

United States Patent and Trademark Office, "Non-Final Office Action", issued in connection with U.S. Appl. No. 11/112,017, dated Mar. 16, 2010 (15 pages).

United States Patent and Trademark Office, "Non-Final Office Action", issued in connection with U.S. Appl. No. 11/112,017, dated Mar. 29, 2011 (13 pages).

United States Patent and Trademark Office, "Final Office Action", issued in connection with U.S. Appl. No. 11/112,017, dated Dec. 30, 2008 (12 pages).

United States Patent and Trademark Office, "Final Office Action", issued in connection with U.S. Appl. No. 11/112,017, dated Aug. 17, 2010 (17 pages).

United States Patent and Trademark Office, "Final Office Action", issued in connection with U.S. Appl. No. 11/112,017, dated Sep. 27, 2011 (15 pages).

United States Patent and Trademark Office, "Advisory Action", issued in connection with U.S. Appl. No. 11/112,017, dated Feb. 10, 2009 (3 pages).

Patent Cooperation Treaty, "International Search Report", issued in connection with PCT Application No. PCT/US2006/012020, dated Feb. 6, 2007 (2 pages).

(56) References Cited

OTHER PUBLICATIONS

Patent Cooperation Treaty, "Written Opinion", issued in connection with PCT Application No. PCT/US2006/012020, dated Feb. 6, 2007 (3 pages).
Patent Cooperation Treaty, "International Preliminary Report on Patentability", issued in connection with PCT Application No. PCT/US2006/012020, dated Nov. 1, 2007 (4 pages).
United States Patent and Trademark Office, "Decsion on Appeal," issued in connection with U.S. Appl. No. 11/112,017, dated May 22, 2015 (8 pages).
United States Patent and Trademark Office, "Notice of Allowance" issued in connection with U.S. Appl. No. 13/710,194, dated Oct. 15, 2015 (36 pages).
United States Patent and Trademark Office, "Non-Final Office Action" issued in connection with U.S. Appl. No. 13/710,194, dated Jun. 9, 2015 (40 pages).

* cited by examiner

| SHORT NAME | TYPE | MAJOR CHANNEL | MINOR CHANNEL | SOURCE ID | EXTENDED NAME |
|---|---|---|---|---|---|
| KNBC | ANALOG | 4 | 0 | 4 | KNBC LA |
| KNBC-D1 | DIGITAL | 37 | 1 | 1 | KNBC LA |
| KNBC-D2 | DIGITAL | 37 | 2 | 2 | KNBC-SPORTS |
| KNBC-D3 | DIGITAL | 37 | 3 | 3 | KNBC-TIME SHIFTED |
| KNBC-D4 | DIGITAL | 37 | 4 | 4 | KNBC-WEATHER |

METHODS AND APPARATUS TO BROADCAST ADVANCED TELEVISION SYSTEM COMMITTEE VIDEO IN SWITCHED DIGITAL VIDEO SYSTEMS

RELATED APPLICATION

This patent arises from a continuation of U.S. application Ser. No. 13/710,194, which was filed on Dec. 10, 2012, which arose from a continuation of U.S. application Ser. No. 11/112,299, which was filed on Apr. 22, 2005 and was granted on Jan. 8, 2013 as U.S. Pat. No. 8,352,979. U.S. application Ser. No. 13/710,194 and U.S. application Ser. No. 11/112,299 are hereby incorporated herein by reference in their entireties.

FIELD OF THE DISCLOSURE

This disclosure relates generally to switched digital video (SDV) systems, and, more particularly, to methods and apparatus to broadcast Advanced Television System Committee (ATSC) video in SDV systems.

BACKGROUND

The amplitude modulated (AM)—vestigial sidebands (VSB) 6 Megahertz (MHz) television (TV) broadcast system only supports one standard definition video channel plus a pair of stereo audio channels and two auxiliary audio channels. In 1995, the Federal Communications Commission (FCC) adopted the Advanced Television System Committee (ATSC) broadcast standards for digital TV (DTV) (e.g., A/53B, A/65B, A/90, etc.). With support of motion picture experts group (MPEG) multiple program transport streams (MPTSs), the ATSC DTV standards include dynamic support for and transport of one or more program streams (e.g., each containing video plus audio) within a single 6 MHz broadcast channel. For example, a broadcaster may simultaneously provide a football game, a local news program, and weather information within a single MPTS. The ATSC DTV standards support an effective payload of approximately 19.3 Megabits per second (Mbps) for a terrestrial 6 MHz broadcast channel or approximately 38 Mbps for a 6 MHz cable broadcast channel.

FIG. 1 is a schematic illustration of an example prior art transmitter 100 for the prior art ATSC DTV broadcast system. A plurality of application encoders 105 principally perform data compression and encoding for a plurality of sources 110 (e.g. video, audio, data, etc.) to reduce the number of bits required to represent the sources 110. For example, the ATSC DTV system uses MPEG-2 compression for video sources and the ATSC compression standard (AC-3) for audio sources. A plurality of outputs 115 (i.e., program streams) of the application encoders 105 are provided to a transport packetizer and multiplexer (TPM) 120 that divides each of the program streams 115 into packets of information (including the addition of uniquely identifying information) and multiplexes the plurality of packetized program streams 115 into a single MPTS 125. The TPM 120 also receives, packetizes, and multiplexes program and system information protocol (PSIP) information 127 into the MPTS 125. Finally, a modulator 130 uses the MPTS 125 to modulate a carrier to create a radio frequency (RF) transmission 135. The modulator 130 uses either 8-VSB or 16-VSB. Example implementations of the application encoders 105, the TPM 120, and the modulator 130 are well known to persons of ordinary skill in the art, and, thus, will not be discussed further.

The PSIP information 127 (as defined in ATSC standard A/65A) is a small collection of hierarchically arranged tables designed to operate within every MPTS to describe the programs carried within the MPTS. There are two main categories of PSIP information 127: system information and program data. System information allows navigation and access of the channels (i.e., program streams) within the MPTS, and program data provides necessary information for efficient selection of programs. Some tables announce future programs, and some are used to logically locate current program streams that make up the MPTS.

FIG. 2 is an example set of PSIP information tables 200 illustrating the relationships between the various tables. The master guide table (MGT) 205 provides indexing information for the other tables. It also defines table sizes necessary for memory allocation during decoding, defines version numbers to identify those tables that are new or need updating, and generates the packet identifiers (PID) that label the tables. For example, MGT 205 entry 207 points to the zero$^{th}$ (i.e., original) version of a ratings region table (RRT) 210. The RRT 210 is designed to transmit the ratings system in use for each country. For example, in the United States the RRT 210 represents the television parental guidelines (TVPG), more commonly referred to as the "V-chip" system. A system time table (STT) 215 is a small data structure that serves as a reference for time of day functions, e.g., to manage scheduled events, display time-of-day, etc.

A virtual channel table (VCT) 220 contains a list of all the channels that are or will be active, plus their attributes, e.g., channel name and number. Event information tables 225*a-b* describe the program(s) for a time interval of three hours. There may be up to 128 EITs, EIT-0 through EIT-127, allowing for up to 16 days of programming to be advertised in advance.

Example implementations of generating PSIP information, PSIP tables, PSIP packets, and decoding PSIP information and tables are well known to persons of ordinary skill in the art and, in the interest of brevity, will not be discussed further.

FIG. 3 further illustrates information contained in the VCT 220. In the example table, Short Name is typically displayed in the upper corner of a TV screen to identify a channel and Type indicates the type of channel. Major Channel indicates a 6 MHz RF broadcast channel, with Minor Channel indicating sub channels. Source ID provides a PID within a MPTS, and Extended Names are typically displayed in an electronic program guide (EPG). The VCT 220 facilitates selection and location of programs by a receiver or a user of a set-top box or television. The VCT 220 can be updated in real-time so that situations like over-time (OT) in sporting events can be supported in addition to the regularly scheduled programs, reducing the number of times that programs are "joined in progress."

FIG. 4 illustrates an example portion of a programming line-up transported in a MPTS showing how bandwidth of the MPTS could be utilized to support multiple simultaneous programs. The example of FIG. 4 conveys several points:

1. Bandwidth requirements are dynamic. In the case of nondeterministic programs, like sports, an allocation may change on a moment by moment basis.

2. The number of programming streams will change as programming options change.

3. The UT vs. A&M OT situation underscores the dynamic nature of the MPTS.

4. Services such as Weather Graphics, Text and other low bit rate services may also be supported.

5. Names of channels may change as the programming line up changes.

The PSIP tables provide the necessary information so that an EPG can be created and/or updated, but also so that a receiver can locate, select and display programs. There are several subtle differences that exist between the PSIP protocols for terrestrial broadcast and the cable multiple service operator's PSIP. These slight differences are standardized, well understood by those of ordinary skill in the art, and, will not be discussed further. However, a device supporting both terrestrial and cable broadcasts, must support both forms of PSIP information.

DETAILED DESCRIPTION

As described above, the dynamic nature of the ATSC DTV system provides tremendous flexibility in providing and transporting programs. Terrestrial, cable and satellite broadcast systems are very similar, and implementations of the ATSC DTV standards within those systems have substantially leveraged existing infrastructure. For example, all three systems (terrestrial, cable, and satellite) simply provide all programming to the customer premises, and selection of programs is implemented in customer premise equipment (CPE). In a SDV system, switching is implemented out of necessity within the SDV system due to a bandwidth constrained transport network (e.g., digital subscriber line (DSL), passive optical network (PON), etc.). Thus, in a SDV system all programming cannot be provided to a customer premises, and a different method of supporting the ATSC DTV standards is required.

Figure 1:
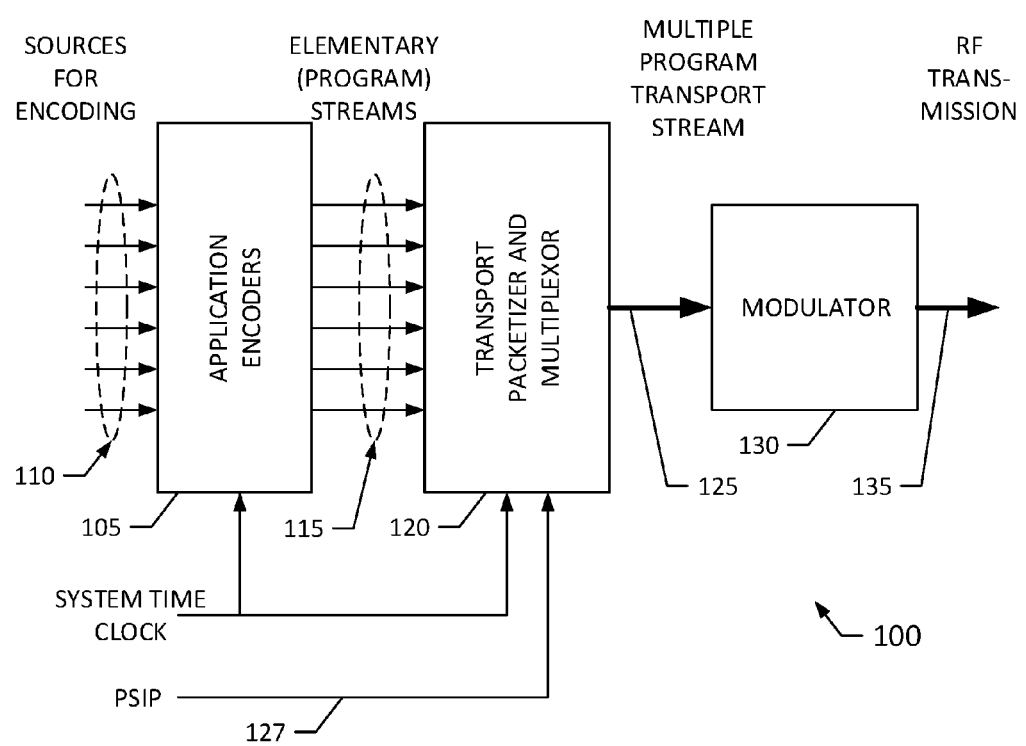
FIG. 1 is a schematic illustration of an example prior art transmitter for the prior art ATSC DTV broadcast system.
Figure 2:
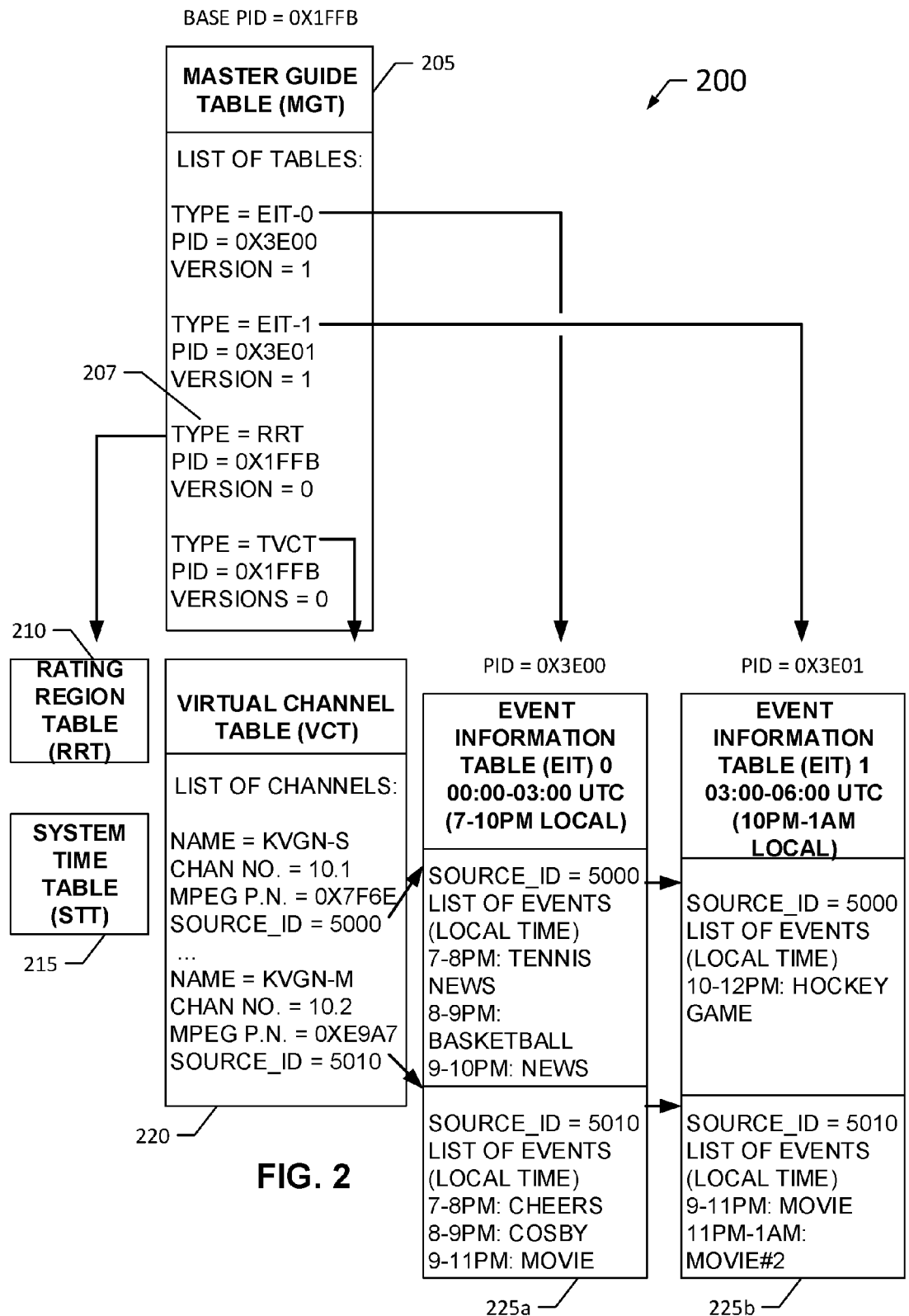
FIG. 2 is an example of the relationships among PSIP tables for the prior art ATSC DTV broadcast system.
Figures 3, 4:
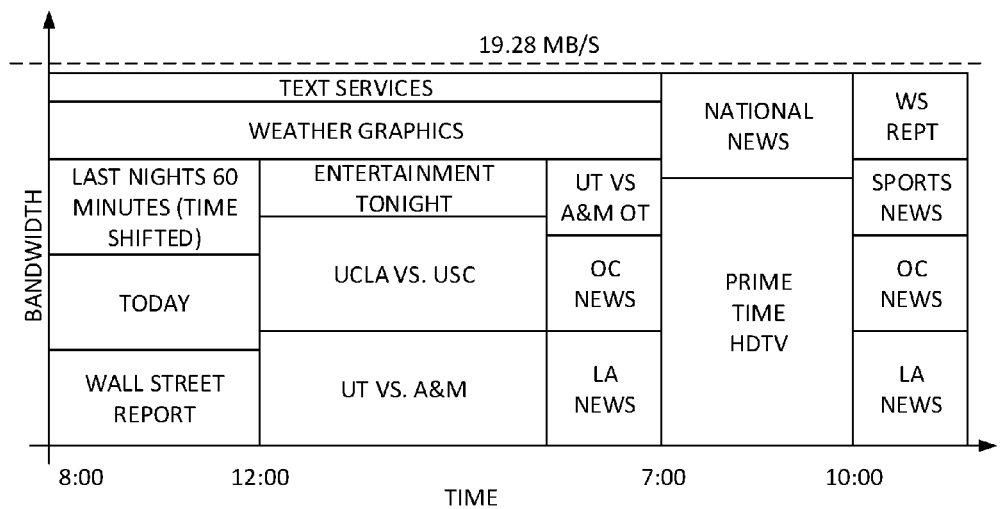
FIG. 3 further illustrates example information contained in the VCT of FIG. 2.
FIG. 4 shows an example bandwidth utilization of a MPEG MPTS.
Figure 5:
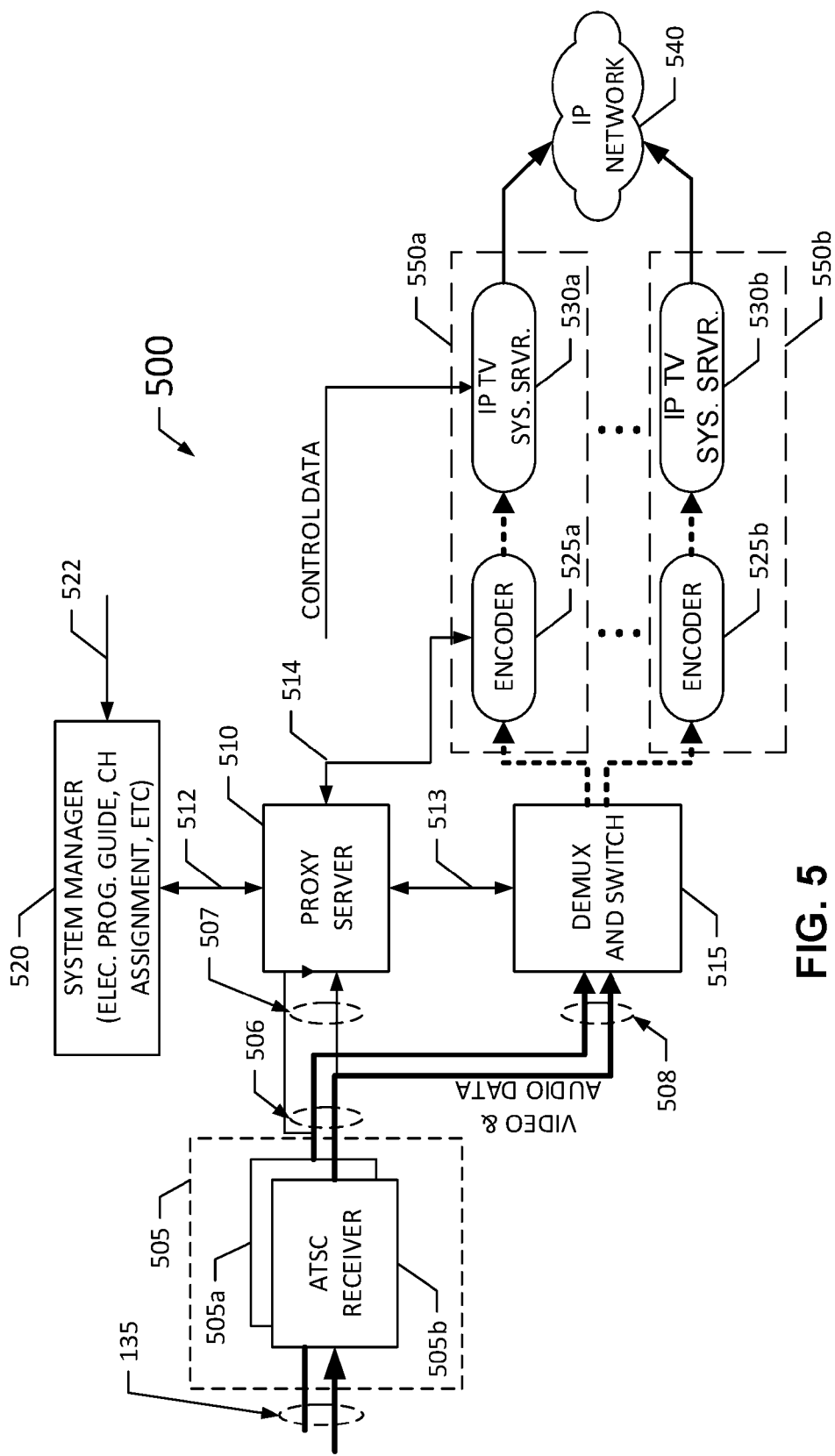
FIG. 5 is a schematic diagram illustrating an example system for broadcasting ATSC video in a SDV system constructed in accordance with the teachings of the invention.

FIG. 5 illustrates an example SDV system 500 constructed in accordance with the teachings of the invention that supports ATSC DTV based MPTSs. The SDV system 500 of FIG. 5 receives a plurality of RF transmissions 135 which are demodulated by a plurality of ATSC receivers 505a-b to create a plurality of MPTSs 506. In the illustrated example, the SDV system 500 further separates the MPTSs 506 into a plurality of PSIP streams 507 (primarily comprising PSIP information packets present in the MPTSs 506) and a plurality of transport streams 508 (primarily comprising program packets (e.g., packets containing video, audio, etc.) present in the MPTSs 506). Alternatively, the SDV system 500 does not split the resulting MPTSs 506, thus, the PSIP streams 507 and the transport streams 508 are identical to the MPTSs 506.

In the illustrated example, the plurality of ATSC receivers 505a-b are implemented as separate devices. Alternatively, one or more ATSC receivers 550a-b, each capable of demodulating one or more RF transmissions, may be employed. For instance, a single ATSC receiver 500 capable of demodulating a plurality of RF transmissions may be employed to receive and demodulate all of the received RF transmissions 135.

In the illustrated example, a PSIP stream 507 (which may be null or empty) and a transport stream 508 (which may be null or empty) are associated with each of the RF transmissions 135. The number of PSIP streams 507 and transport streams 508 may be dynamically created and destroyed based upon the number of active RF transmissions 135. Further, the PSIP streams 507 could be multiplexed together to create one or more combined PSIP stream(s). Likewise, the transport streams 508 could be multiplexed together to create one or more combined transport stream(s). Example implementations of ATSC receivers 505, 505a-b are well known to persons of ordinary skill in the art, and, thus, are not discussed further.

To connect one or more program streams (not shown) contained in the plurality of transport streams 508 with a plurality of SDV broadcast engines 550a-b, the SDV system 500 includes a de-multiplexer and switch (DS) 515. The DS 515 of the illustrated example de-multiplexes one or more of the plurality of transport streams 508 into one or more program streams (which may include an audio stream, a video stream, a data stream and/or a control stream for a single program), and further connects one or more of the program streams to one or more of the SDV broadcast engines 550a-b.

In the illustrated example of FIG. 5, each SDV broadcast engine 550a-b includes a video encoder 525a-b and an Internet protocol (IP) TV system server (ITSS) 530a-b. The video encoder 525a-b re-encodes/re-compresses a program stream to further reduce the number of bits required to represent the program stream. In the illustrated example, the video encoder 525a-b implements the MPEG-4 or Microsoft's® VC1 encoding standard. The re-encoded program stream is then passed to the ITSSs 530a-b that, among other things, adds any necessary or provisioned encryption, packetizes the re-encoded program streams into IP packets, and provides the packetized re-encoded program streams to an IP network 540 for transport to a customer (not shown) that is also connected to the IP network 540. Example implementations of SDV broadcast engines 550a-b, video encoders 525a-b, and ITSS 530a-b are well known to persons of ordinary skill in the art, and, thus, will not be discussed further.

As will be described in more detail in conjunction with FIGS. 6-9, the illustrated example SDV system 500 includes a proxy server 510 to configure and control the de-multiplexing and connecting performed by the DS 515, the video encoders 525a-b, and the ITSSs 530a-b. The proxy server 510 decodes the PSIP streams 507 to create PSIP information tables for each of the RF transmissions 135 (and, thus, for each transport stream 508 and each PSIP stream 507). The proxy server 510 provides the PSIP information tables to a system manager 520 which indicates selected programs and assigned SDV system resources (e.g., SDV broadcast engine 550a-b, video encoder 525a-b, etc.) based on inputs 522 explained below. Finally, the proxy server 510 configures the DS 515, one or more of the video encoders 525a-b, and one or more of the ITSSs 530a-b based on the program selections and SDV resource assignments received from the system manager 520.

The system manager 520, among other things, implements and maintains an EPG for each RF transmission 135, and processes the EPGs against one or more business objectives, operational rules (e.g., regular program streams, broadcasters, stations, broadcast networks that have been provisioned within the SDV system 500), ratings rules, contractual commitments, or customer requests to select which programs will be broadcast by the SDV system 500 to customers and those that will not. For each selected program, the system manager 520 assigns a SDV broadcast engine 550a-b (e.g., a video encoder 525a-b and an ITSS 530a-b). Further, the system manager 520 processes the EPG to determine programs that have ended (or are no longer to be broadcast to customers). For each of the ended (or are no longer to be broadcast to customers) programs the system manager 520 de-allocates the associated SDV broadcast engine 550a-b. In one example, the system manager 520 may be implemented by a general purpose computer with a user interface that facilitates entering of programming schedule instructions by a system administrator.

Figure 6:
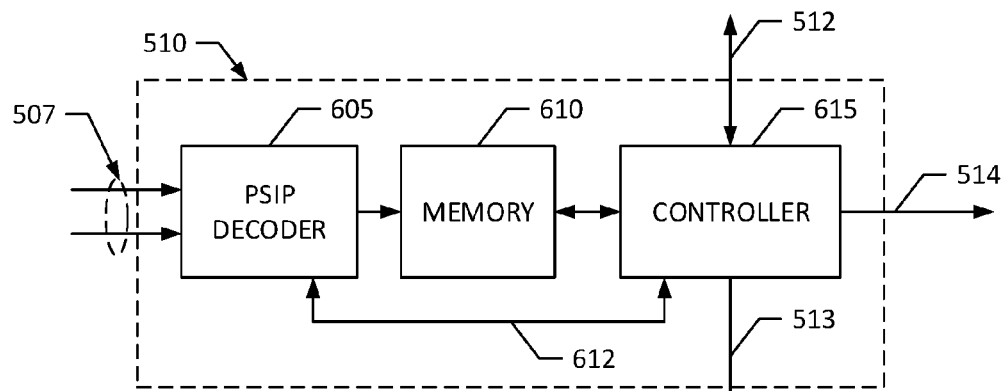
FIG. 6 is a schematic illustration of an example manner of implementing the proxy server of FIG. 5.

FIG. 6 illustrates an example manner of implementing the proxy server 510 of FIG. 5. To decode the PSIP information contained in the PSIP streams 507, the example proxy server 510 includes a PSIP decoder 605. The PSIP decoder 605 uses well known existing prior art techniques to decode the PSIP information to create corresponding PSIP tables in a memory 610 for each of the PSIP streams 507. In the illustrated example, the PSIP decoder 605 continually updates the PSIP tables for a PSIP stream in the memory 610 as additional PSIP information is received on the PSIP streams 507. In this manner, the PSIP decoder 605 maintains up-to-date PSIP tables in the memory 610. Whenever the PSIP decoder 605 creates, updates, or deletes one or more PSIP tables, the PSIP decoder 605 notifies a controller 615 using signal line(s) 612 that new or updated PSIP information is available. In the illustrated example, the PSIP decoder 605 decodes PSIP information for each of the PSIP streams 507. Alternatively, the proxy server 510 may be implemented by one or more PSIP decoders, each of which decodes one or more of the PSIP streams 507. For example, a PSIP decoder may be implemented for each of the PSIP streams 507.

Upon receiving notification that new or updated PSIP information is available, the controller 615 notifies the system manager 520 using signal line(s) 512. In the illustrated example, the controller 615 provides changes to the PSIP information to the system manager 520. Alternatively, the controller 615 may provide the entire set of PSIP tables for the one or more PSIP streams 507 that have new or updated PSIP information whenever a change occurs.

The controller 615 receives signals via line(s) 512 from the system manager 520 identifying assignments of one or more selected programs to one or more SDV broadcast engines 550a-b (e.g., video encoders 525a-b, ITSS 530a-b). For each of the selected programs, the controller 615 receives an identification of an allocated SDV broadcast engine 550a-b. The controller 615 also receives notifications from the system manager 520 via line(s) 512 identifying that one or more programs are no longer selected, and that associated SDV broadcast engines 550a-b can, thus, be de-allocated. Based upon the information received from the system manager 520, the controller 615 maintains a table in the memory 610 of selected programs, and the associated SDV broadcast engine 550a-b for each selected program.

To configure the SDV system 500, the controller 615 of FIG. 6 communicates with the DS 515 and the SDV broadcast engines 550a-b. In particular, the controller 615 configures the DS 515 using signal line(s) 513, and configures the video encoders 525a-b and the ITSSs 530a-b using signal lines(s) 514. To configure the DS 515 for each selected program, the controller 615 provides signals via line(s) 513 that indicate, among other things, which program streams to de-multiplex from one or more of the transport streams 508, and to which SDV broadcast engine 550a-b (i.e., output port) each de-multiplexed program stream is to be connected. To configure the video encoders 525a-b and ITSSs 530a-b, the controller 615 provides signals via line(s) 514 that include, among other things, instructions identifying the desired format, standard definition (SD) versus high definition (HD), encoding configuration/standard, audio information, etc.

Figure 7:
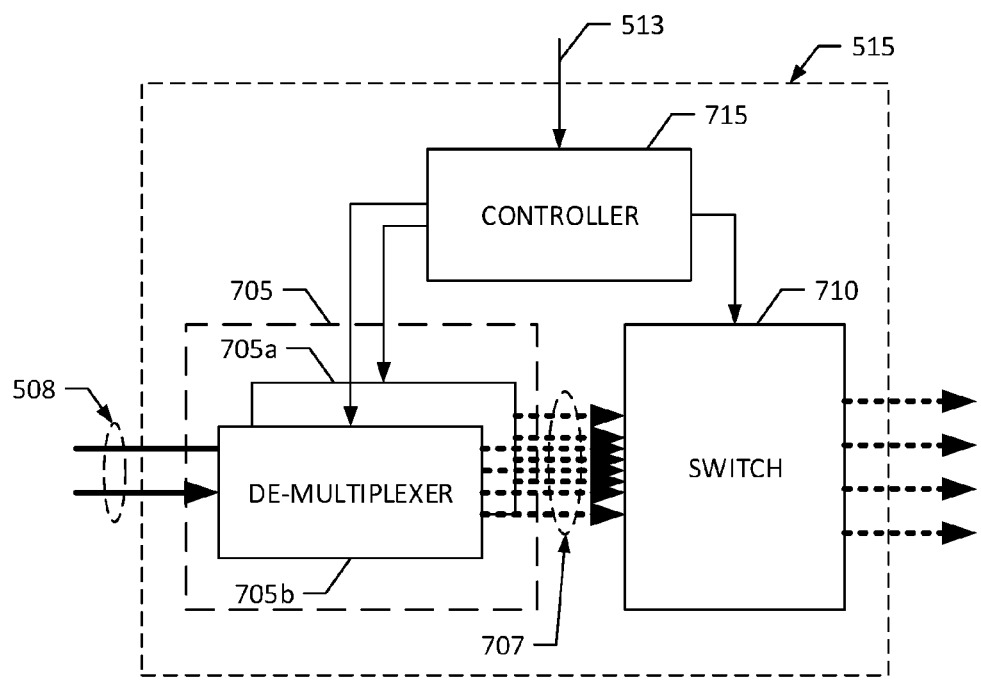
FIG. 7 is a schematic illustration of an example manner of implementing the de-multiplexer and switch of FIG. 5.

FIG. 7 is an example manner of implementing the DS 515 of FIG. 5. To de-multiplex one or more of the plurality of transport streams into a plurality of program streams 707, the DS 515 includes a plurality of de-multiplexers 705a-b. In the illustrated example, a de-multiplexer 705a-b is implemented for each of the transport streams 508. The DS 515 could alternatively include one or more de-multiplexers 705a-b that can de-multiplex one or more transport streams 508. For example, the DS 515 could be implemented by one de-multiplexer 705 that de-multiplexes all of the transport streams 508. In such an example, the de-multiplexer 705 should be capable of de-multiplexing at least the maximum number of program streams 707 supported by the SDV system 500. The maximum number is approximately equal to or less than the maximum number of possible program streams per transport stream times the number of transport streams 508. For implementation efficiency, the SDV system 500 and, thus, the de-multiplexer 705 could alternatively support fewer than the maximum number of program streams 707.

To connect program streams 707 with video encoders 525a-b, the DS 515 includes a cross-connection switch 710. In the illustrated example, the cross connection switch 710 is configurably capable to connect any input port (associated with a program stream 707) with any output port (associated with a video encoder 525a-b. Alternatively, the switch 710 may only be able to connect each input port with a subset of the output ports. In the illustrated example, the switch 710 is implemented as a single device. Alternatively, the switch 710 may be implemented as multiple devices, where each device may switch some or all of the input ports to some or all of the output ports.

To configure and control the de-multiplexers 705, 705a-b and the switch 710, the DS 515 includes a controller 715. The controller 715 receives the information necessary to configure and control the de-multiplexers 705, 705a-b and the switch 710 from the proxy server 510 via the signal line(s) 513. In the illustrated example, the received information includes one or more sets of information identifying a transport stream 508, a program stream 707 within the transport stream 508, and an output port (associated with a video encoder 525a-b) to allocate or de-allocate. The controller maps or uses the received information to generate appropriate configuration and control signals for the de-multiplexers 705, 705a-b and the switch 710.

Figure 8:
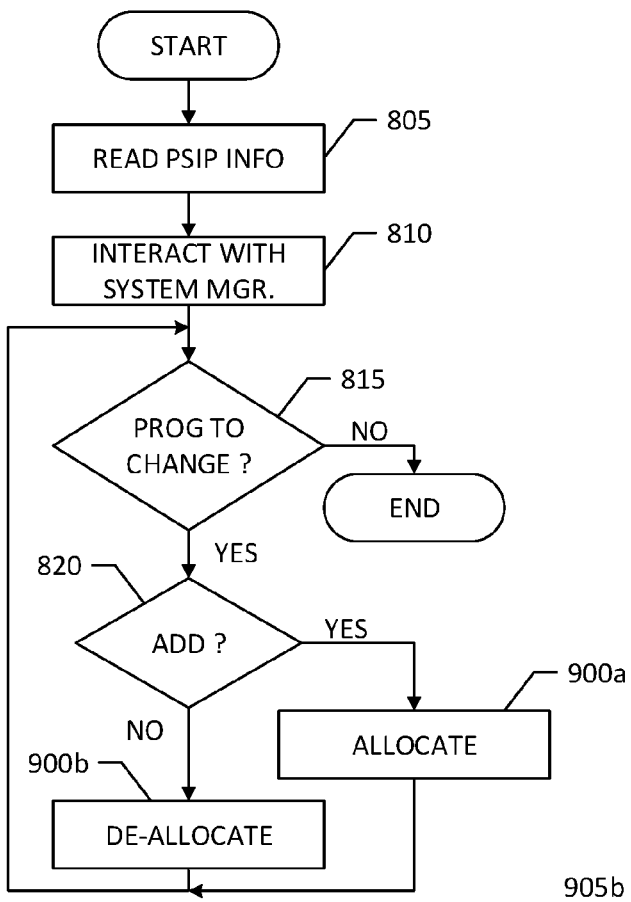
FIG. 8 is a flow chart representative of machine readable instructions which may be executed to implement the controller of FIG. 6.
Figure 9A:
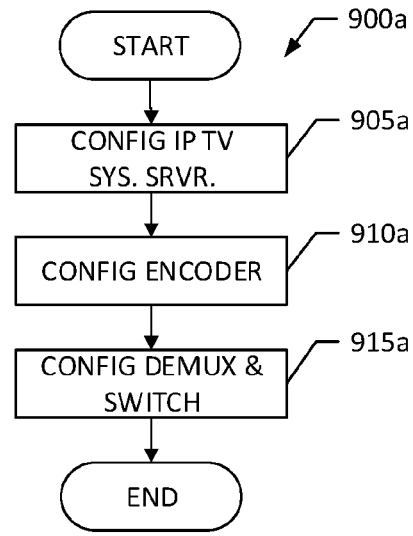
FIGS. 9a-b are flow charts representative of machine readable instructions which may be executed to implement the controller of FIG. 6.
Figure 9B:
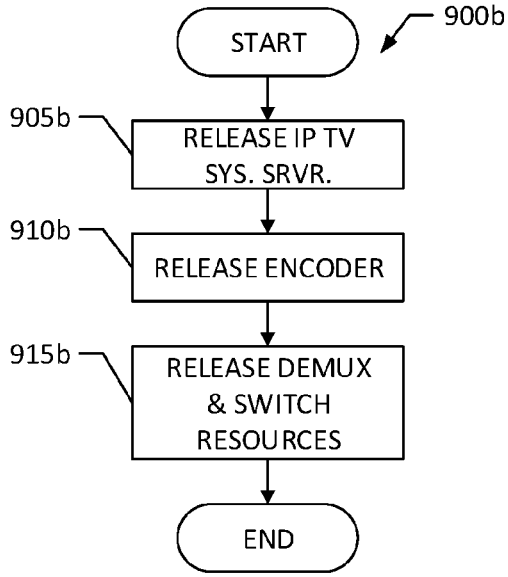

FIGS. 8, 9a and 9b illustrate flowcharts representative of example machine readable instructions that may be executed by the example controller 615 of FIG. 6. The machine readable instructions of FIGS. 8, 9a and 9b may be implemented by a processor, a controller, or any other suitable processing device. For example, the machine readable instructions of FIGS. 8, 9a and 9b may be embodied in coded instructions stored on a tangible medium such as a flash memory, or random-access memory (RAM) associated with the processor 1010 shown in the example processor platform 1000 discussed below in conjunction with FIG. 10. Alternatively, the machine readable instructions of FIGS. 8, 9a and 9b may be implemented using an application specific integrated circuit (ASIC), a programmable logic device (PLD), a field programmable logic device (FPLD), discrete logic, etc. Also, some portion(s) of the machine readable instructions of FIGS. 8, 9a and 9b may be implemented manually or as combinations of any of the foregoing techniques. Further, although the example machine readable instructions of FIGS. 8, 9a and 9b are described with reference to the flowcharts of FIGS. 8, 9a and 9b, persons of ordinary skill in the art will readily appreciate that many other methods of implementing the example controller 615 of FIG. 6 may be used. For example, the order of execution of the blocks may be changed, and/or some of the blocks described may be changed, eliminated, or combined.

The example program of FIG. 8 begins when the controller 615 reads new or updated PSIP tables from the memory (block 805). Next, the controller 615 provides the new or updated PSIP information to the system manager 520 and receives one or more program stream selections or de-selections from the system manager 520 (block 810). For each of the program stream selections or de-selections (block 815), the controller 615 determines if the program stream is being added or removed (i.e., selected or de-selected) (block 820). If the program stream is being added, the controller 615 sends one or more signals to the DS 515 and the SDV broadcast engines 550a-b to execute the example program represented by FIG. 9a (block 900a). Otherwise the controller 615 sends one or more signals to the DS 515 and the SDV broadcast engines 550a-b to execute the example program represented by FIG. 9b (block 900b). Once, all program stream selections or de-selections are completed (block 815), the controller 615 ends the example program of FIG. 8.

Additionally, the controller 615 may receive program selection information (e.g., program selections, program de-selections, SDV broadcast engine 550a-b assignments, etc.) from the system manager 520 at times other than when the controller 615 provides program information to the system manager 520 (block 810). In this case, the controller 615 carries out a portion of the example program of FIG. 8 comprising blocks 815-820 and interacts with the DS 515 and the SDV broadcast engines 550a-b to perform allocation or de-allocation in accordance with FIGS. 9a and 9b.

The example process of FIG. 9a begins with the controller 615 sending configuration and control information (e.g., format, SD vs. HD, audio information, enable, etc.) using the signals 514 to an ITSS 530a-b (block 905a) and to a video encoder 525a-b (block 910a). Next, the controller 615 sends configuration information (e.g., selection of a transport stream 508, a program stream 707, an output port, and an allocate indication) to the controller 715 of FIG. 7 (block 915a).

The example process of FIG. 9b begins with the controller 615 sending control information using the signals 514 to an ITSS 530a-b (block 905b) and to a video encoder 525a-b (block 910b) to disable them. Next, the controller 615 sends configuration information (e.g., selection of a transport stream 508, a program stream 707, an output port, and de-allocate indication) to the controller 715 of FIG. 7 (block 915b) to de-allocate SDV resources.

Figure 10:
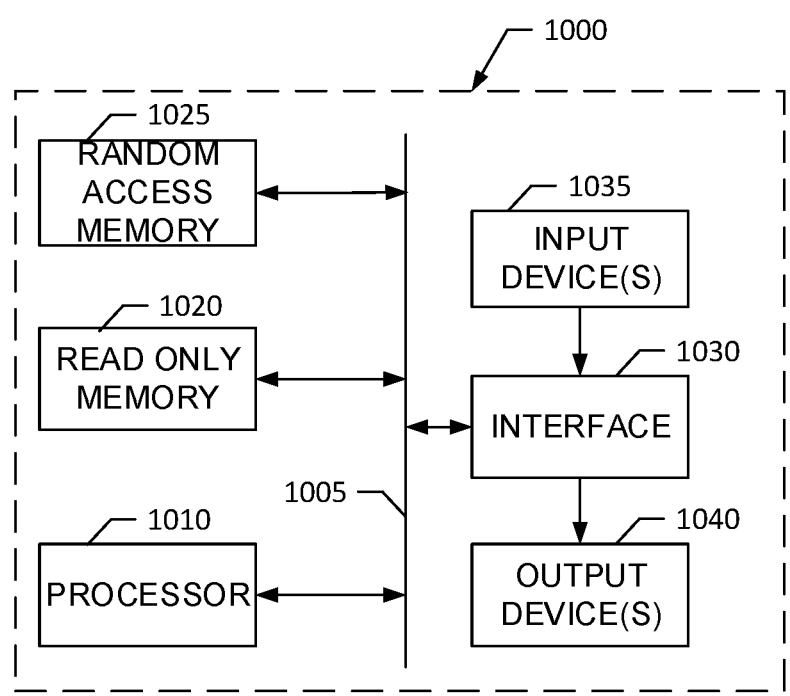
FIG. 10 is a schematic illustration of an example processor platform that may execute the example machine readable instructions represented by FIGS. 8 and 9a-b to implement the controller of FIG. 6.

FIG. 10 is a block diagram of an example processor platform 1000 capable of implementing the example processes 800 and 900a-b of FIGS. 8, 9a-b. For example, the processor platform 1000 can be implemented by one or more general purpose microprocessors, microcontrollers, etc.

The processor platform 1000 of the example includes the processor 1010 that is a general purpose programmable processor. The processor 1010 executes coded instructions present in main memory of the processor 1010. The processor 1010 may implement, among other things, the controller 615 of FIG. 6 and/or the controller 715 of FIG. 7.

The processor 1010 is in communication with the main memory including a read only memory (ROM) 1020, a random access memory (RAM) 1025, and the memory 610 of FIG. 6 via a bus 1005. The RAM 1025 may be implemented by Synchronous Dynamic Random Access Memory (SDRAM), Dynamic Random Access Memory (DRAM), and/or any other type of random access memory device. The ROM 1020 may be implemented by flash memory and/or any other desired type of memory device. Access to the memory space 1020, 1025, 610 is typically controlled by a memory controller (not shown) in a conventional manner.

The processor platform 1000 also includes a conventional interface circuit 1030. The interface circuit 1030 may be implemented by any type of well known interface standard, such as an external memory interface, serial port, general purpose input/output, etc.

One or more input devices 1035 are connected to the interface circuit 1030. The input device(s) 1035 (e.g., signals 612, 512) may be used to provide the processor 1010 information on programs present on RF transmissions 135 and selected and de-selected programs.

One or more output devices 1040 are also connected to the interface circuit 1030. The output devices 1040 (e.g., signals 512, 513, 514) may be used by the processor 1010 to provide program information to a system manager 520, control information to DS 515, and/or control information to SDV broadcast engines 550a-b (e.g., video encoders 525a-b, ITSSs 530a-b).

From the foregoing, persons of ordinary skill in the art will appreciate that the above disclosed methods and apparatus may be realized within a single device or across two cooperating devices, and could be implemented by software, hardware, and/or firmware to implement the improved wireless receiver disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for broadcasting program streams in a switched digital video (SDV) system that receives a plurality of multiple program transport streams, the method comprising:

accessing a first instruction to allocate a first de-multiplexer to de-multiplex a first multiple program transport stream, the first instruction identifying a first program stream of the first multiple program transport stream for inclusion in a broadcast for transmission from the SDV system to a customer premises, and a second program stream of the first multiple program transport stream for exclusion from the broadcast based on a rating region table (RRT);

de-multiplexing, with the first de-multiplexer, the first multiple program transport stream;

accessing a second instruction to allocate a second de-multiplexer to de-multiplex a second multiple program transport stream, the second instruction identifying a third program stream of the second multiple program transport stream for inclusion in the broadcast, the second de-multiplexer different from the first de-multiplexer;

de-multiplexing, with the second de-multiplexer, the second multiple program transport stream; and selecting, for inclusion in the broadcast, using a cross-connection switch, and in response to the first and second instructions, the first program stream output by the first de-multiplexer and the third program stream output by the second de-multiplexer.

2. The method as defined in claim 1, wherein the inclusion of the first program stream and the exclusion of the second program stream is independent of any user provided program stream request, and independent of any contractual commitment associated with any user.

3. The method as defined in claim 1, further including encoding the first program stream and the third program stream, and delivering the first encoded program stream to an SDV broadcast engine.

4. The method as defined in claim 3, wherein the SDV broadcast engine includes a video encoder and an Internet protocol television system server.

5. The method as defined in claim 3, wherein the SDV broadcast engine is to broadcast the first encoded program stream over an Internet protocol network.

6. The method as defined in claim 1, further including demodulating a radio frequency transmission to receive the first multiple program transport stream.

7. The method as defined in claim 1, wherein the accessing of the first instruction includes decoding program information contained in the first multiple program transport stream to update the RRT.

8. The method as defined in claim 1, wherein the RRT includes parental guidance information.

9. An apparatus for broadcasting program streams in a switched digital video (SDV) system that receives a plurality of multiple program transport streams, the apparatus comprising:

a first de-multiplexer;
a second de-multiplexer different from the first de-multiplexer;
a cross-connection switch;
a processor; and
a memory including machine-readable instructions that, when executed by the processor, cause the processor to perform operations including:
 accessing a first de-multiplexing instruction to de-multiplex a first multiple program transport stream, the first de-multiplexing instruction identifying a first program stream of the first multiple program transport stream for inclusion in a broadcast for transport from the SDV system to a customer premises, and a second program stream of the plurality of program streams for exclusion from the broadcast based on a rating region table (RRT);
 de-multiplexing, with the first de-multiplexer, the first multiple program transport stream;
 accessing a second de-multiplexing instruction to de-multiplex a second multiple program transport stream, the second instruction identifying a third program stream of the second multiple program transport stream for inclusion in the broadcast;
 de-multiplexing, with the second de-multiplexer, the second multiple program transport stream; and
 selecting, for inclusion in the broadcast, using the cross-connection switch, and in response to the first and second instructions, the first program stream output by the first de-multiplexer and the third program stream output by the second de-multiplexer.

10. The apparatus as defined in claim 9, wherein the inclusion of the first program stream and the exclusion of the second program stream is independent of any user provided program stream request, and independent of any contractual commitment associated with any user.

11. The apparatus as defined in claim 9, wherein the machine-readable instructions, when executed, further cause the processor to encode the first program stream and the third program stream, and deliver the first encoded program stream to an SDV broadcast engine.

12. The apparatus as defined in claim 11, wherein the SDV broadcast engine is to broadcast the first encoded program stream over an Internet protocol-network.

13. The apparatus as defined in claim 9, wherein the accessing of the de-multiplexing instruction includes decoding program information contained in the first multiple program transport stream to update the RRT.

14. The apparatus as defined in claim 9, wherein the RRT represents parental guidance information.

15. A tangible machine readable storage disk or storage device comprising instructions that, when executed, cause a machine to perform operations including:

accessing a first de-multiplexing instruction to allocate a first de-multiplexer to de-multiplex a first multiple program transport stream, the first de-multiplexing instruction identifying a first program stream of the first multiple program transport stream for inclusion in a broadcast for transmission from a switched digital video system to a customer premises, and a second program stream of the first multiple program transport stream for exclusion from the broadcast based on a rating region table (RRT);

de-multiplexing, with the first de-multiplexer, the first multiple program transport stream;

accessing a second de-multiplexing instruction to allocate a second de-multiplexer to de-multiplex a second multiple program transport stream, the second de-multiplexing instruction identifying a third program stream of the second multiple program transport stream for inclusion in the broadcast, the second de-multiplexer different from the first de-multiplexer;

de-multiplexing, with the second de-multiplexer, the second multiple program transport stream; and selecting, for inclusion in the broadcast, using a cross-connection switch, and in response to the first and second de-multiplexing instructions, the first program stream output by the first de-multiplexer and the third program stream output by the second de-multiplexer.

16. The storage disk or storage device as defined in claim 15, wherein the inclusion of the first program stream and the exclusion of the second program stream is independent of any user provided program stream request, and independent of any contractual commitment associated with any user.

17. The storage disk or storage device as defined in claim 15, wherein the machine-readable instructions, when executed, further cause the machine to encode, using an encoder, the first program stream and the third program stream, and deliver, using a switch, the first encoded program stream to a switched digital video broadcast engine.

18. The storage disk or storage device as defined in claim 17, wherein the switched digital video broadcast engine is to broadcast the first encoded program stream over an Internet protocol network.

19. The storage disk or storage device as defined in claim 15, wherein the accessing of the first de-multiplexing instruction includes decoding program information contained in the first multiple program transport stream to update the RRT.

20. The storage disk or storage device as defined in claim 15, wherein the RRT represents parental guidance information.

* * * * *